United States Patent [19]
Oki et al.

[11] Patent Number: 5,780,185
[45] Date of Patent: Jul. 14, 1998

[54] CATHODE MATERIALS FOR LITHIUM BATTERIES AND METHODS FOR PRODUCING THE SAME

[75] Inventors: Naohiko Oki; Minoru Noguchi; Atsushi Demachi; Kenji Sato; Eisuke Komazawa; Kazuhiro Araki, all of Wako, Japan

[73] Assignee: Honda Giken Kogyo Kabushiki Kaisha, Tokyo, Japan

[21] Appl. No.: 540,127

[22] Filed: Oct. 6, 1995

Related U.S. Application Data

[63] Continuation-in-part of Ser. No. 253,924, Jun. 3, 1994, abandoned.

[30] Foreign Application Priority Data

| Jun. 7, 1993 | [JP] | Japan | 5-159982 |
| May 11, 1994 | [JP] | Japan | 6-120782 |
| Oct. 7, 1994 | [JP] | Japan | 6-268107 |

[51] Int. Cl.[6] .................. H01M 4/48; H01M 4/52
[52] U.S. Cl. ............................................. 429/218
[58] Field of Search ..................... 429/218; 252/518, 252/521

[56] References Cited

U.S. PATENT DOCUMENTS

| 4,675,260 | 6/1987 | Sakurai et al. | 429/191 |
| 4,737,424 | 4/1988 | Tobishima et al. | 429/197 |
| 5,037,478 | 8/1991 | Okai et al. | 106/479 |
| 5,196,278 | 3/1993 | Idota | 429/194 |
| 5,273,848 | 12/1993 | Noguchi et al. | 429/218 |
| 5,286,582 | 2/1994 | Tahara et al. | 429/218 |
| 5,393,714 | 2/1995 | Thometzek et al. | 501/29 |

FOREIGN PATENT DOCUMENTS

| 0503901 | 9/1992 | European Pat. Off. |
| 59-134561 | 8/1984 | Japan |
| 1128355 | 5/1989 | Japan |
| 3105858 | 9/1989 | Japan |
| 233868 | 2/1990 | Japan |
| 5225981 | 9/1993 | Japan |
| 5299088 | 11/1993 | Japan |

OTHER PUBLICATIONS

Proceedings Of The Symposium On High Power, Ambient Temperature Lithium Batteries, vol. 92, No. 15, Oct. 1991, Pheonix AZ, US, pp. 113–126, D. Guyomard et al.; "Lithium Metal–Free Rechargeable LT1+SMN2O4/Carbon Cells".

Chemical Abstracts, vol. 115, No. 10, Sep. 9, 1991, Columbus, OH, US, Okada et al. "Manufacture Of Secondary Nonaqueous Batteries".

F. Albert Cotton and Geoffrey Wilkinson, "Advanced Inorganic Chemistry", Wiley–Interscience, 1972, p. 885.

*Primary Examiner*—Stephen Kalafut
*Assistant Examiner*—Carol Chaney
*Attorney, Agent, or Firm*—Birch, Stewart, Kolasch & Birch, LLP

[57] ABSTRACT

An amorphous solid solution of $V_2O_5$, $CoO_2$, $P_2O_5$, MO (wherein M represents an alkaline earth metal element) and at least one lithium compound selected from the group consisting of lithium-oxygen compounds, lithium halides and lithium oxygen acid salts is formed by melting precursor materials therefore, then the melt is put into water or pressed with metal plates to quench it, and the solid solution is heat treated above its glass transition temperature, the resulting solid solution being used as a cathode material for a lithium battery, thereby obtaining the lithium battery preventing the capacity of a carbon anode from lowering and excellent in long-term cycle stability.

20 Claims, 8 Drawing Sheets

CATHODE MATERIALS FOR LITHIUM BATTERIES AND METHODS FOR PRODUCING THE SAME

This application is a continuation-in-part of application Ser. No. 08/253,924 filed on Jun. 3, 1994 abandoned, the entire contents of which are hereby incorporated by reference.

BACKGROUND OF THE INVENTION

The present invention relates to cathode materials used in lithium batteries in which carbon materials are used as anode materials, and methods for producing same.

Various sulfides and oxides have hitherto been proposed as cathode materials of lithium batteries. Compound oxides and amorphous compounds have also been proposed. For example, Japanese Patent Unexamined Publication No. 134561/1984 discloses a cathode active material composed of a solid solution prepared by adding phosphorus pentaoxide to vanadium pentaoxide and burning the resulting mixture, followed by rapid quenching. Japanese Patent Unexamined Publication No. 2-33868/1990 discloses a cathode formed of an amorphous powder prepared by melting and rapidly quenching a mixture of vanadium pentaoxide and 30 mol% or less of phosphorus pentaoxide. Even if these cathode materials are used, however, the problem can not be solved that repetitive charge and discharge cycling causes a reduction in capacity. Accordingly, no cathode material satisfactory in cycle stability has been yet obtained. Further, conductive agents are required to be added to the cathode materials because of their low conductivity. In spite of the addition of the conductive agents, a large current flow causes large polarization, resulting in decreased energy density. Furthermore, as to the amorphous compounds, it has been desired to obtain the stable compounds easily.

In order to solve these problems, the present inventors have already proposed a cathode material for a lithium battery comprising an amorphous solid solution comprising vanadium pentaoxide, diphosphorus pentaoxide and an alkaline earth metal oxide in a specified ratio, and a method of producing the same (Japanese Patent Unexamined Publication No. 5-299088/1993, corresponding to U.S. Pat. No. 5,273,848, the entire disclosure of which is herein incorporated by reference), and a cathode material for a lithium battery comprising an amorphous solid solution comprising vanadium pentaoxide, diphosphorus pentaoxide, an alkaline earth metal oxide and cobalt oxide, and a method for producing the same (Japanese Patent Unexamined Publication No. 5-225981).

These vanadium pentaoxide cathode materials are satisfactory in charge-discharge cycle stability, and stable amorphous cathode materials can be produced by these methods. However, when these cathode materials are used in combination with carbon anodes, the problem arises that the charge capacity is low to the discharge capacity in the cathodes at initial cycles. Namely, some lithium remains in the cathodes, and is not dedoped. As the battery systems, therefore, the amount of lithium in the carbon anodes decreases, which causes a reduction in capacity.

SUMMARY OF THE INVENTION

It is therefore a primary object of the present invention to provide a vanadium pentaoxide cathode material which can give a lithium battery satisfactory in charge-discharge efficiency, prevented from lowering in the capacity of a carbon anode, and excellent in long-term cycle stability from initial cycles.

Another object of the present invention is to provide methods for producing this cathode material easily.

According to the present invention, there is provided a cathode material for a lithium battery comprising a solid solution comprising $V_2O_5$, $CoO_2$, $P_2O_5$, MO (wherein M represents an alkaline earth metal element) and at least one lithium compound selected from the group consisting of lithium-oxygen compounds, lithium halides and lithium oxygen acid salts.

Further, the present invention provides a method for producing a cathode material for a lithium battery which comprises forming a melted mixture of $V_2O_5$, $CoO_2$, $P_2O_5$, MO (wherein M represents an alkaline earth metal element) and at least one lithium compound selected from the group consisting of lithium-oxygen compounds, lithium halides and lithium oxygen acid salts, and then putting the melt into water to quench it.

Furthermore, the present invention provides a method for producing a cathode material for a lithium battery which comprises forming a melted mixture of $V_2O_5$, $CoO_2$, $P_2O_5$, MO (wherein M represents an alkaline earth metal element) and at least one lithium compound selected from the group consisting of lithium-oxygen compounds, lithium halides and lithium oxygen acid salts, and then pressing the melt with metal plates to quench it.

For the cathode materials of the present invention, the resulting solid solutions are preferably heat treated at a temperature from 100° to 500° C., after quenching by the putting of the melt into water or the pressing with the metal plates, and before or after pulverization of the solid solution to form a powder. On heat treatment, the conductivity is improved to obtain cathode materials excellent in cycle stability, small in polarization and decreased in a reduction in energy density.

In another embodiment of the present invention, a melted solid solution of $V_2O_5$, $CoO_2$, $P_2O_5$, MO (wherein M represents an alkaline earth metal element) and the Li compound is formed, quenched by putting it into water or pressing it with metal plates, and then, before or after quenching, preferably after quenching, heat treated over the glass transition temperature of the solid solution, preferably at a temperature of 210° to 500° C., more preferably 210° to 300° C.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings of which.

DESCRIPTION OF THE PREFERRED EMBODIMENTS

Figure 1:
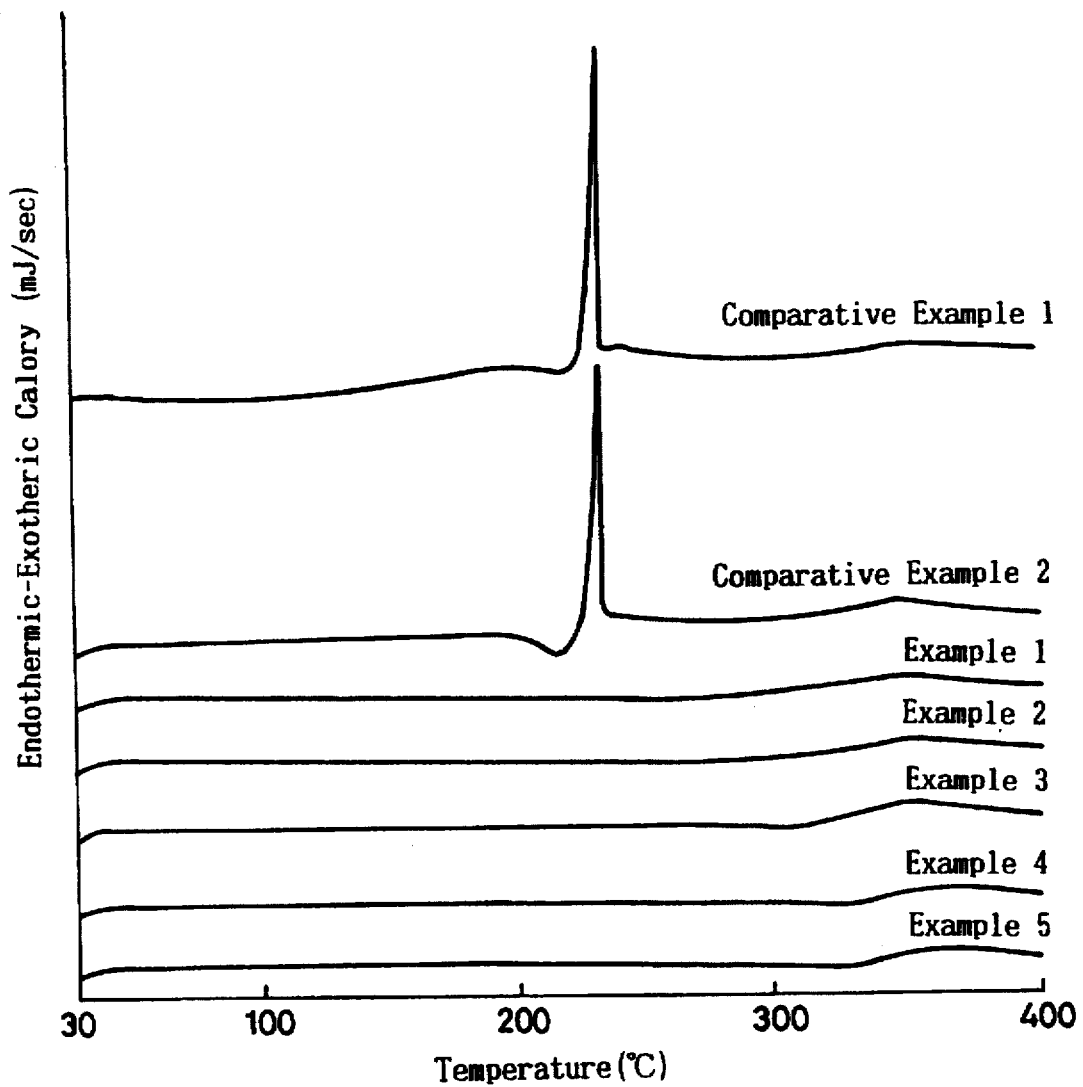
FIG. 1 is a comparison of differential scanning calorimetry curves for Examples 1–5 and the Comparative Examples.

The cathode material of the present invention comprises a solid solution comprising $V_2O_5$, $CoO_2$, $P_2O_5$, MO (wherein M represents an alkaline earth metal element) and a Li compound. The alkaline earth metal oxide (MO) is preferably MgO or CaO.

The Li compound is at least one compound selected from the group consisting of lithium-oxygen compounds, lithium halides and lithium oxygen acid salts such as $Li_2O$, $LiOH.H_2O$, $Li_2CO_3$, LiF, LiCl, LiBr and LiI.

The ratio of the respective ingredients contained in the solid solution is as follows:

$V_2O_5$: 64 to 92 mol%, preferably 65 to 80 mol%

$CoO_2$: 10 mol% or less based on $V_2O_5$, preferably 1 to 6 mole%

$P_2O_5$: 1 to 24 mol%, preferably 2 to 15 mol%

MO: 2 to 25 mol%, preferably 2 to 15 mol%

(wherein $V_2O_5+P_2O_5+CoO_2+MO=100$ mol%)

Less than 64 molo of $V_2O_5$ reduces the discharge capacity, whereas more than 92 mol% of $V_2O_5$ causes difficulty in making the solid solution amorphous, which leads to unsatisfactory results as a cathode material. If the content of $CoO_2$ is less than 1 molo based on $V_2O_5$, the effect caused by addition of $CoO_2$ (namely, a greater improvement in cycle stability) is not obtained in some cases. On the other hand, if the content of $CoO_2$ exceeds 10 mol%, both the initial capacity and cycle stability are decreased. Further, less than 1 molo of $P_2O_5$, brings about difficulty in making the solid solution amorphous, which leads to unsatisfactory results as a cathode material, whereas more than 24 mole of $P_2O_5$ reduces the discharge capacity. Furthermore, less than 2 mol% of MO brings about difficulty in making the solid solution amorphous, which leads to unsatisfactory results as a cathode material, whereas more than 25 mol% of MO reduces the discharge capacity.

The cathode material containing the amorphous solid solution comprising above-mentioned ingredients in such molar ratio ranges is satisfactory in cycle stability. In the present invention, however, the Li compounds are further added thereto to previously dope lithium between layers of $V_2O_5$. Irreversible lithium not dedoped at initial cycles is added on synthesis, whereby the charge and discharge can be conducted at a charge-discharge efficiency of 100% from the first cycle.

The amount of such a Li compound is adjusted so as to be able to reversibly cycle to the designed amount of the charge-discharge cycle capacity of the cathode material from initial cycles. Namely, the amount of Li ions in the Li compound is preferably 2.0 mols or less per mol of $V_2O_5$. More than 2.0 mols of the Li ions unfavorably causes difficulty in making the solid solution amorphous. The amount thereof is preferably 0.1 to 2.0 mols, more preferably 0.25 to 1.65 mols and most preferably 0.30 to 1.0 mol.

The cathode material of the present invention comprises the solid solution comprising $V_2O_5$, $CoO_2$, $P_2O_5$, MO and the Li compound as described above, and exhibits an amorphous structure, for example, by X-ray diffraction. However, on heat treatment thereof, the conductivity is improved, resulting in the more preferred cathode material excellent in cycle stability, small in polarization and decreased in reduction in energy density even at a large current flow. The reason for this is considered to be that electrochemically, the potential linearly varies without having a flat portion, similarly with the amorphous material, thereby improving the cycle stability, and from X-ray diffraction, the ratio of amorphous portions is decreased to enlarge the structure unit, thereby by improving the conductivity and reducing the polarization.

Methods for producing the cathode materials of the present invention are described below.

In the methods of the present invention, a solid solution C of $V_2O_5$, $CoO_2$, $P_2O_5$, MO (wherein M represents an alkaline earth metal element) and the Li compound described above is formed and melted to form a melt, and then the melt is put into water or pressed with metal plates to quench it. In melting, it is preferred that the mixture is kept at 200° to 500° C. for 30 minutes to 6 hours and further at 560° to 740° C. for 5 minutes to 1 hour.

The solid solution thus obtained is amorphous.

In order to obtain amorphous solid solutions, rapid quenching is usually required. In general, the melts are rapidly quenched at room temperature at a quenching rate of about $10^{6o}$ C./sec using twin copper rollers. In the present invention, melted solid solutions of $V_2O_5$, $CoO_2$, $P_2O_5$, MO and the Li compound are formed whereby the amorphous solid solution can be obtained even by the water quenching method (rapid quenching rate: $10^2$ to $10^{3o}$ C./sec) or the metal plate pressing method (rapid quenching rate: 10 to $10^4$ °C./sec) which is low in rapid quenching rate. The amorphous solid solution can therefore be easily obtained without using a large-scale rapid quenching device. The resulting amorphous solid solution is very stable, and an excellent cathode material can be obtained by pulverizing the amorphous solid solution mechanically.

In the present invention, a melted solid solution of $V_2O_5$, $CoO_2$, $P_2O_5$, MO (wherein M represents an alkaline earth metal element) and the Li compound is formed, quenched by putting it into water or pressing it with metal plates, and then, before or after quenching, preferably after quenching, heat-treated over the glass transition temperature of the solid solution, preferably at a temperature of 210° to 500° C., more preferably 210° to 300° C.

Heat treatment can be conducted in the air or in a stream of hydrogen. The atmosphere in which heat treatment is conducted is not particularly limited. On heat treatment, the solid solutions vary from a homogeneous isotropic amorphous structure to improve the conductivity, thereby obtaining the cathode materials excellent in cycle stability, low in polarization and decreased in reduction in energy density.

However, if the heat treatment temperature is below the glass transition temperature of the solid solution, complete crystallization requires a prolonged heat treating time, which is not preferred, on the other hand, if the treatment temperature is higher than 500° C., sintering occurs. Accordingly, if it is possible to heat treat below glass transition temperature, it is not preferred.

Also, by conducting the heat treatment after quenching, uneven heating can be avoided and heat treatment can be done evenly.

The heat-treating time can be prolonged when the temperature is low and shortened when the temperature is high. When a larger amount of the material is treated, a longer period of time is required with respect to heat conduction, and when a smaller amount of the material is treated, the treatment effect can be exhibited after a shorter period of time. The heat-treating time is usually 30 minutes to 20 hours, and when the temperature, as indicated above, is higher than the glass transition temperature, 100 g of a sample is heat treated in a crucible, and the treatment can be completed within about 2 hours.

When the cathode materials of the present invention are used to prepare cathodes, the grain size of the cathode materials is not necessarily restricted. However, the use of the cathode materials having a grain size of 5 µm or less can provide highly efficient cathodes. In this case, conductive agents such as acetylene black and binding agents such as powdered fluororesins can be added to the cathode materials, mixed in a dry state to form mixtures. The mixtures are then rolled through rollers, followed by drying to prepare the cathodes. The amount of the conductive agents added may be 5 to 50 parts by weight per 100 parts by weight of cathode material, and preferably 7 to 10 parts by weight. In the present invention, the cathode materials are satisfactory in conductivity, so that the amount of the conductive agents used can be reduced. The binding agents are preferably compounded in an amount of 5 to 10 parts by weight per 100 parts by weight of cathode material.

Any nonaqueous electrolytes are used in batteries using the cathode materials of the present invention, as long as they are chemically stable to the cathode materials and anode materials and lithium ions are transferable therethrough to electrochemically react with the cathode materials. In particular, compounds formed by combinations of cations and anions are preferably used. Examples of such cations include but are not limited to $Li^+$, and examples of such anions include but are not limited to halide anions of the group Va elements such as $PF_6^-$, $AsF_6^-$ and $SbF_6^-$, halogen anions such as $I^-$ ($I_3^-$), $Br^-$ and $Cl^-$, perchlorate anions such as $ClO_4^-$, and anions such as $HF_2^-$, $CF_3SO_3^-$ and $SCN^-$. Examples of the electrolytes having such cations and anions include $LiPF_6$, $LiAsF_6$, $LiSbF_6$, $LiBF_4$, $LiClO_4$, $LiI$, $LiBr$, $LiCl$, $LiAlCl_4$, $LiHF_2$, $LiSCN$ and $LiSO_3CF_3$. Of these compounds, $LiPF_6$, $LiAsF_6$, $LiBF_4$, $LiClO_4$, $LiSbF_6$ and $LiSO_3CF_3$ are particularly preferred.

The nonaqueous electrolytes are generally used in a state in which the electrolytes have been dissolved in solvents. In this case, there is no particular restriction on the solvents. However, solvents having a relatively high polarity are preferably used. Examples of such solvents include propylene carbonate, ethylene carbonate, butylene carbonate, diethyl carbonate, dimethyl carbonate, tetrahydrofuran, 2-methyltetrahydrofuran, dioxolane, dioxane, dimethoxyethane, glymes such as diethylene glycol dimethyl ether, lactones such as γ-butyrolactone, phosphates such as triethyl phosphate, borates such as triethyl borate, sulfur compounds such as sulfolane and dimethyl sulfoxide, nitriles such as acetonitrile, amides such as dimethylformamide and dimethylacetamide, dimethyl sulfate, nitromethane, nitrobenzene and dichloroethane. These solvents may be used alone or in combination. Of these solvents, one selected from ethylene carbonate, propylene carbonate, butylene carbonate, tetrahydrofuran, 2-methyltetrahydrofuran, dimethoxyethane, dioxolane, γ-butyrolactone, diethyl carbonate and dimethyl carbonate, or mixtures thereof are particularly suitable.

The nonaqueous electrolytes also include organic solid electrolytes composed of polymers such as polyethylene oxide, polypropylene oxide, polyethylene oxide crosslinked with isocyanates and phosphazene polymers having ethylene oxide oligomers as side chains which are impregnated with the above-mentioned nonaqueous electrolytes; and inorganic solid electrolytes such as inorganic ion derivatives (for example, $Li_3N$ and $LiBCl_4$) and lithium glasses (for example, $LiSiO_4$ and $Li_3BO_3$).

A lithium secondary battery using the cathode material of the present invention is described in more detail by reference to FIG. 10.

Figure 10:
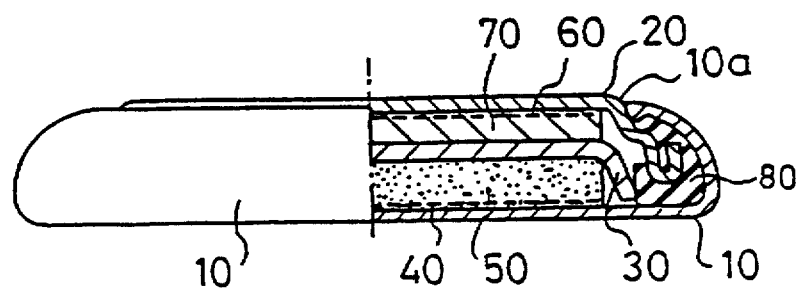
FIG. 10 is a front view partially containing a cross sectional view showing a lithium secondary battery using a cathode material for a lithium battery of the present invention.

Referring to FIG. 10, the lithium secondary battery using the cathode material of the present invention comprises a buttonshaped cathode case 10 having an opening 10a, and anode cap 20 which seals the opening 10a, a separator 30 with fine perforations which partitions the inside of the cathode case 10 into two spaces, a cathode 50 accommodated in the space on the cathode side and having a cathode collector 40 arranged on the side of the cathode case 10, and an anode 70 accommodated in the space on the anode side and having an anode collector 60 arranged on the side of the anode cap 20.

Anode materials used as the above-described anode 70 include, for example, the anode materials described in PCT International Publication No. WO 93/10566, Japanese Patent Unexamined Publication No. 3-176963/1991 and Japanese Patent Unexamined Publication No. 4-79170/1992. In this case, the anode materials described in PCT International Publication No. WO 93/10566 are preferably used because the cathode can receive a large current flow.

As the separator 30 described above, nonwoven, woven and knitted fabrics made of synthetic resins such as polytetrafluoroethylene, polypropylene and polyethylene can be used. The fabrics are porous, and the electrolytes can be passed therethrough and contained therein.

The reference numeral 80 designates an insulating polyethylene packing arranged along an inner wall of the cathode case 10 for supporting the anode cap 20 in an insulated state.

In the present invention, the Li compounds are further added to the $V_2O_5$—$CoO_2$—$P_2O_5$—MO materials excellent as the cathode materials to produce the amorphous solid solutions. Li is therefore previously doped between layers of $V_2O_5$ to introduce irreversible lithium not dedoped at initial cycles into the cathode materials, whereby the charge and discharge can be conducted at a charge-discharge efficiency of 100 % from the first cycle.

When the above-mentioned amorphous solid solutions are further heat treated, the conductivity is improved, resulting in the more preferred cathode materials excellent in cycle stability, small in polarization and decreased in reduction in energy density even at a large current flow. The reason for this is considered to be that electrochemically, the potential linearly varies without having a flat portion, similarly with the amorphous materials (see FIG. 11), thereby improving the cycle stability, and from X-ray diffraction, the ratio of amorphous portions is decreased to enlarge the structure unit, thereby improving the conductivity and reducing the polarization.

According to the present invention, the amorphous solid solutions of the stable $V_2O_5$—$CoO_2$—$P_2O_5$—MO—Li compounds can be easily obtained. When the amorphous solid solutions are further heat treated, the conductivity can be improved, varying the homogeneous isotropic structure of the amorphous materials, thereby obtaining cathode materials excellent in cycle stability, small in polarization and decreased in reduction in energy density even at a large current flow.

Further, the use of these solid solutions thus obtained as the cathode materials can provide cathodes satisfactory in charge-discharge efficiency from the first cycle, and the use of the resulting cathodes can prevent the capacity of carbon anodes from lowering and can give lithium batteries excellent in long-term cycle stability.

The following examples are given to illustrate the present invention and are not intended to be limitations on the scope of the invention.

EXAMPLE 1

$V_2O_5$, $CoCO_3$, $Ca(H_2P_4)_2 \cdot H_2O$ were weighed and mixed in a ball mill so as to give a molar ratio of $V_2O_5$, $CoO_2$, $P_2O_5$, and $CaO$ of 87:5:4:4; and $LiOH \cdot H_2O$ was further weighed and mixed so as to give a $Li/V_2O_5$ molar ratio of 0.6. Then the mixture was placed in a crucible, heated in the air in an electric furnace, and maintained at 400° C. for 30 minutes. Further, the mixture was heated, and maintained at 740° C. for 30 minutes. The resulting melted material was dropped on a copper plate, pressed with another copper plate from the upper side, thereby rapidly cooling it to obtain an amorphous solid solution.

This solid solution was analyzed by X-ray diffraction and assured that it was amorphous.

The solid solution thus obtained was pulverized with a planatary ball mill, and subsequently with a jet mill, and classified to obtain a cathode material powder having an average particle size of 2 μm. 100 g of this powder was placed in a crucible, heated in the air in an electric furnace until it reached 215° C. at a rate of 10° C. per minute, maintained for 2 hours, and then cooled in a furnace. Differential scanning calorimetry (DSC) measurement of the cathode material powder thus obtained was conducted. Results are shown in FIG. 1.

Next, the polarization and the charge-discharge cycle test were carried out in the following manner: First, a conductive agent (Ketjen Black EC 600JD) and a binder polytetrafluoroethylene powder (Teflon 7-J) were each added in an amount of 7.5% by weight to the cathode material powder thus obtained, and mixed, followed by powder pressing and rolling to obtain a 40 mm wide, 200 μm thick sheet. Then, using a cathode half-cell shown in FIG. 9 which comprises counter electrode 3 [a 40 mm wide, 400- μm thick cathode (preliminarily discharged up to 2.4 V vs. Li)], a reference electrode 1 (Li), an electrolyte 2 [a 1 mol/l solution of $LiPF_6$ in a solvent of propylene carbonate (PC) and dimethoxyethane (DME) (the volume ratio: 1:1)] and a separator 4 (a glass mat), both the stoppages of charge and discharge were cycled for 30 minutes at a charge-discharge current density of 1.6 mA/cm², voltage of +3.8 V vs. Li). Change in potential at the stoppage of discharge was polarized.

Figure 2:
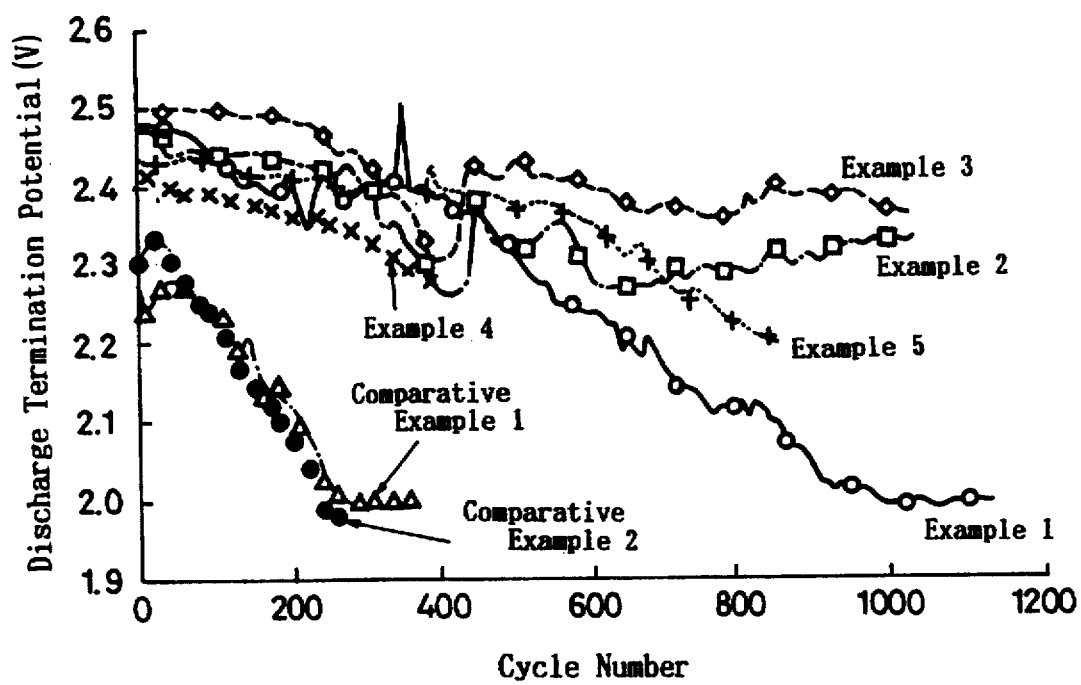
FIG. 2 is a graph showing the relationship between the cycle number and the discharge termination potential in Examples 1 to 5 and the Comparative Examples.
Figure 3:
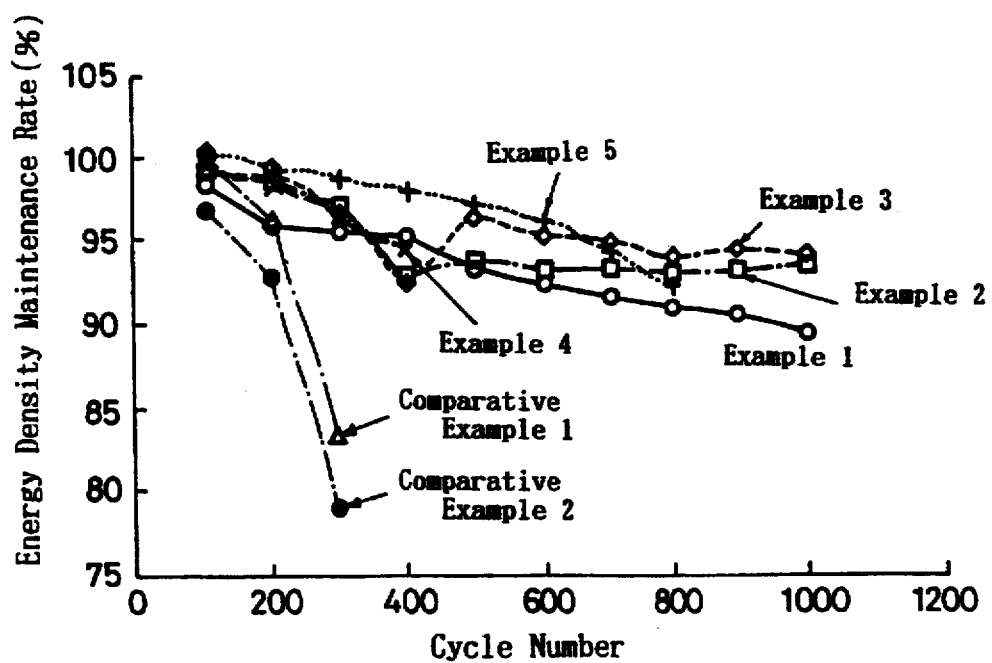
FIG. 3 is a graph showing the relationship between the energy density maintenance rate and cycle number of Examples 1–5 and the Comparative Examples.

The relationship between the cycle number and the potential after the discharge of 150 Ah/kg per active matter (called "termination potential") is shown in FIG. 2, the relationship between the cycle number and the maintenance rate to the initial discharge energy (called "energy density maintenance rate") is shown in FIG. 3.

COMPARATIVE EXAMPLE 1

A cathode material was prepared and tested in the same manner as with Example 1 with the exception that $LiOH \cdot H_2O$ was not added.

EXAMPLES 2 TO 5

The same tests were carried out as in Example 1, plus various heat treatment tests of the obtained cathode material in the air at a temperature of 235° C. (Example 2), 255° C. (Example 3), 275° C. (Example 4), 300° C. (Example 5), and 175° C. (Comparative Example 1).

FIG. 1 shows that examples 1 to 5 do not have any crystallization peak because crystallization occurred during the heat treatment.

In Comparative Example 1, heat treatment was conducted under the above-mentioned glass transition temperature, therefore, crystallization did not occur after two-hour heat treatment, and the same crystallization appeared as the Comparative Example 2 in which heat-treatment was not conducted. Further, the DSC curve of Comparative Example 2 representing amorphous material without heat treatment shows that glass transition temperature is 210° C.

FIG. 2 shows that cycle stability of examples 1 to 5 of which the crystallization structure heat-treated over glass transition temperature is much higher than that of Comparative Examples 1 and 2 because high discharge termination potential is maintained.

FIG. 3 shows that more than 90% of energy density is maintained after 1000 cycles in Examples 1 to 5, meaning that energy maintenance rate is much higher than in Comparative Examples 1 and 2, resulting in excellent cycle stability.

Figure 11:
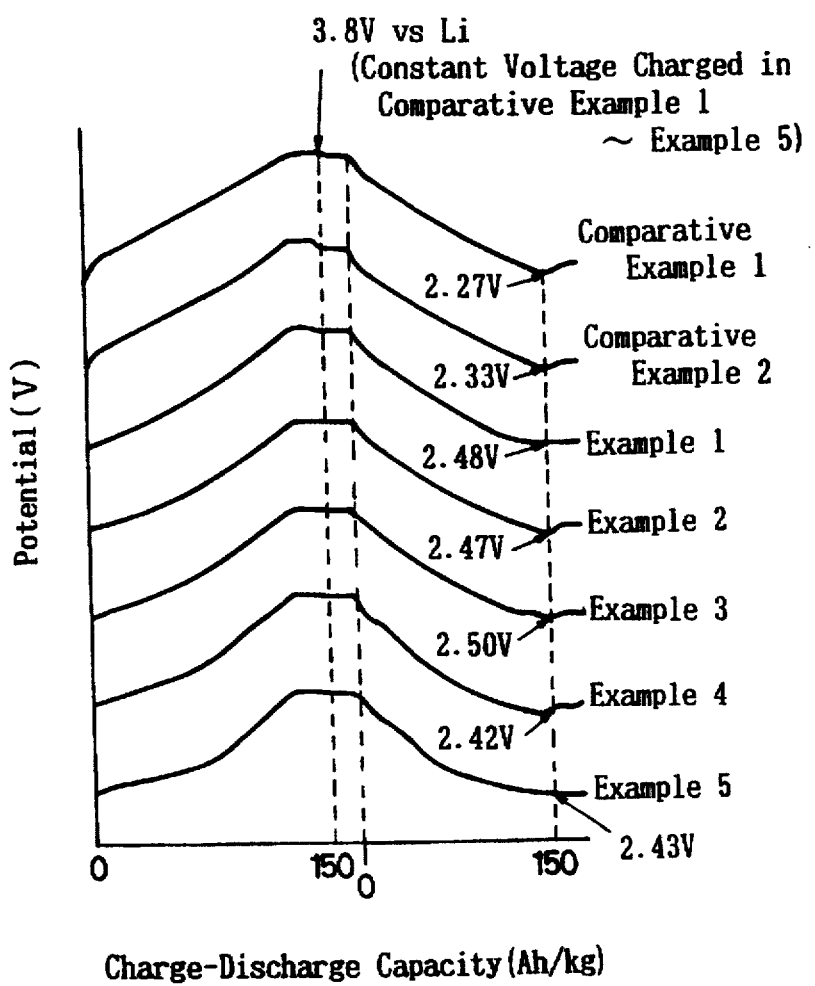
FIG. 11 is a graph showing the relationship between the charge-discharge and the potential in Examples 1–5 and Comparative Examples 1 and 2, demonstrating the linear charge-discharge rate.

FIG. 11 shows that, in Comparative Examples 1 and 2, because examples 1 to 5 do not have any plateau and therefore linear discharge, a solid matrix is even in the entire area even if crystallization occurs.

EXAMPLE 6

$V_2O_5$, $CoCO_3$ and $Ca(H_2PO_4)_2 \cdot H_2O$ were weighed so as to give a $V_2O_5/CoO_2/P_2O_5/CaO$ molar ratio of 87:5:4:4, and $LiOH \cdot H_2O$ was further weighed so as to give a $Li/V_2O_5$ molar ratio of 0.6. Then, they were mixed in a ball mill, and placed in a crucible. The mixture was heated in the air in an electric furnace, and maintained at 400° C. for 30 minutes. Further, the mixture was heated, and maintained at 740° C. for 30 minutes. The resulting melted material was dropped on a copper plate, and pressed with another copper plate from the upper side, thereby rapidly cooling it to obtain an amorphous solid solution.

The solid solution thus obtained was pulverized with a planetary ball mill, and subsequently with a jet mill, and classified to obtain a cathode material powder having an average particle size of 2 μm. This powder was heat treated at 150° C. for 2 hours, and 10% by weight of a polytetrafluoroethylene powder (Teflon 7-J) was added thereto. After mixing, a disk having a diameter of 10 mm and a thickness of 1 mm was formed by powder compression molding. Electrodes of SUS 304 were pressed to both ends thereof, and its resistivity was measured with an impedance analyzer at 1 kHz.

The polarization and the charge-discharge cycle test were carried out in the following manner: First, a conductive agent (Ketjen Black EC 600JD) and a binder [the above-mentioned polytetrafluoroethylene powder (Teflon 7-J)] were each added in an amount of 7.5% by weight to the cathode material powder thus obtained, and mixed, followed by powder pressing and rolling to obtain a 400-mm wide, 400 μm thick sheet. Then, using a cathode half cell shown in FIG. 9 which comprises a counter electrode [a 40-mm wide, 400 μm thick cathode (preliminarily discharged up to 2.7 V vs Li)], a reference electrode (Li), an electrolyte [a 1 mol/l solution of $LiPF_6$ in a solvent of propylene carbonate (PC) and dimethoxyethane (DME) (the volume ratio 1:1)] and a separator (a glass mat), both the stoppages of charge and discharge were cycled for 30 minutes at a charge-discharge current density of 1.6 mA/cm$^2$, discharging at 150 Ah/kg cut and charging at a constant voltage of +3.8 V (vs Li).

Figure 9:
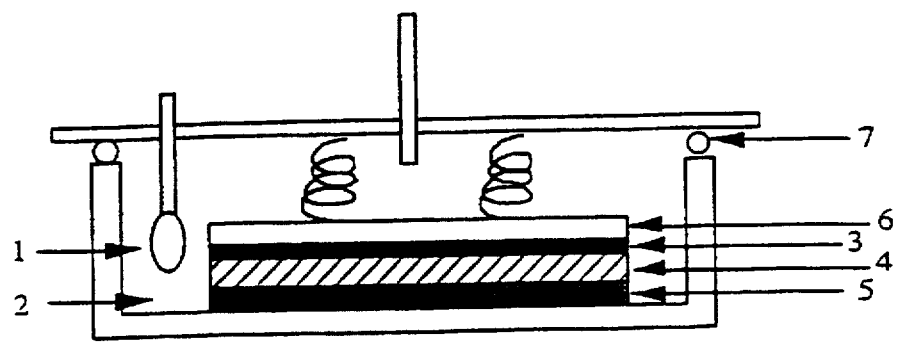
FIG. 9 is a schematic view showing a structure of a cathode half cell for evaluation of electrodes.

Referring to FIG. 9, the reference numeral 1 is the reference electrode (Li), the reference numeral 2 is the electrolyte, the reference numeral 3 is the counter electrode, the reference numeral 4 is a separator, the reference numeral 5 is a test electrode, the reference numeral 6 is a collector (Al) and the reference numeral 7 is an O ring.

Figure 4:
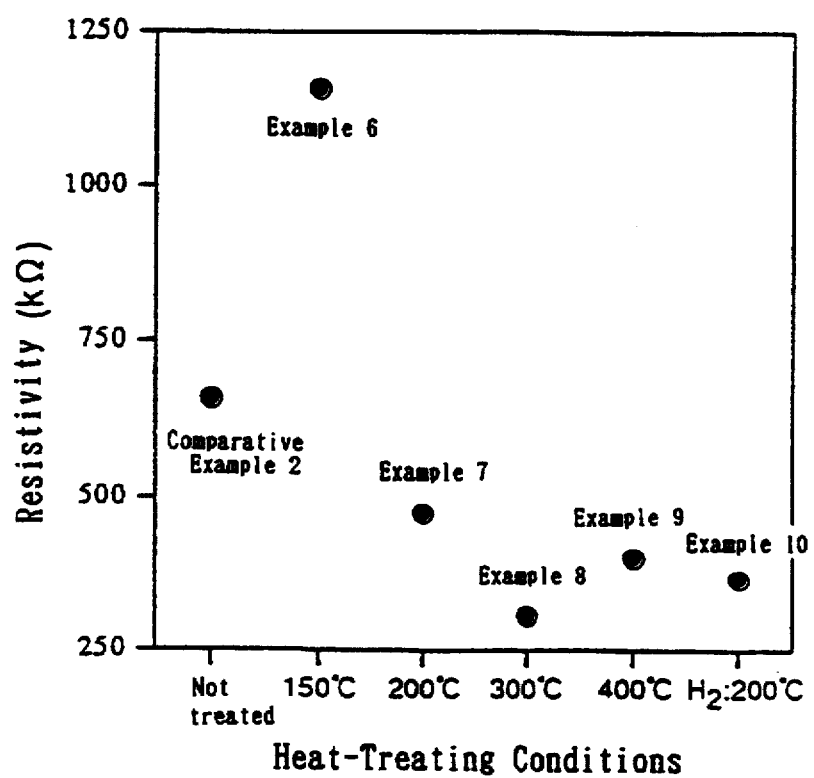
FIG. 4 is a graph showing the relationship between the heat-treating conditions and the resistivity in Examples 6 to 10 and Comparative Example 2.
Figure 5:
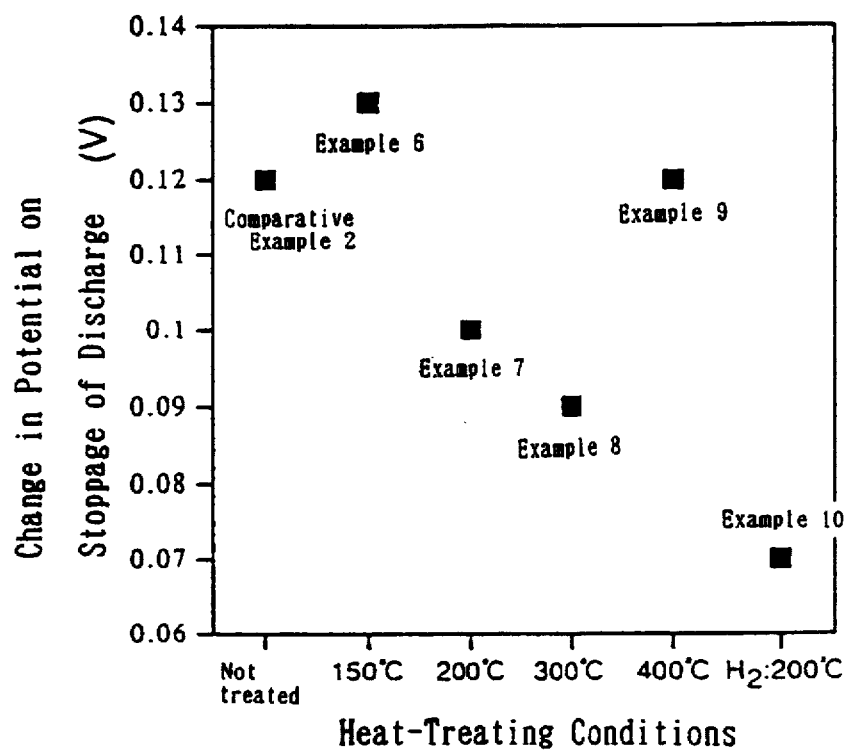
FIG. 5 is a graph showing the relationship between the heat-treating conditions and the change in potential on the stoppage of discharge in Examples 6 to 10 and Comparative Example 2.
Figure 6:
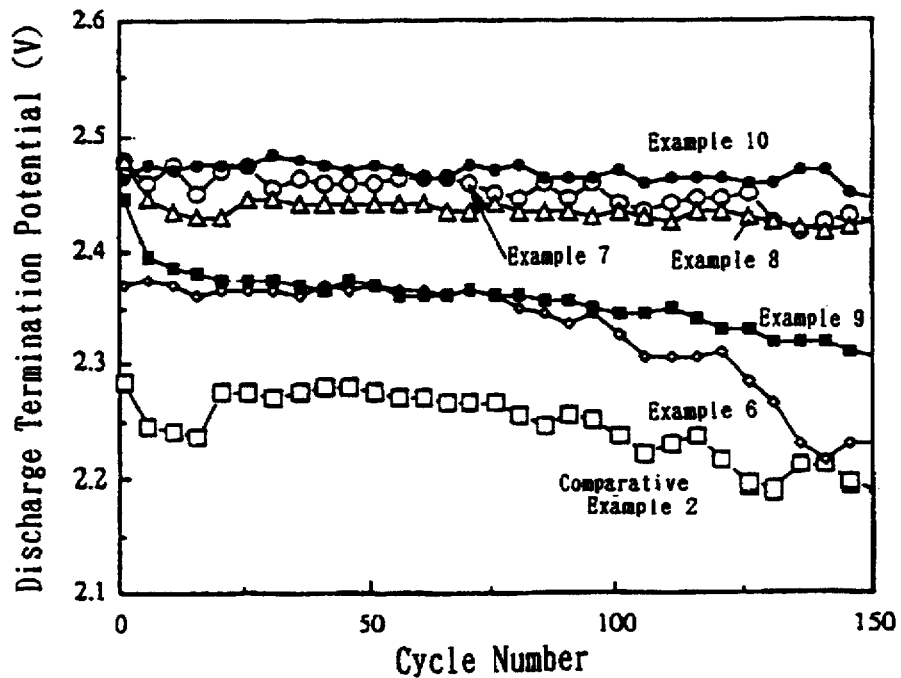
FIG. 6 is a graph showing the relationship between the cycle number and the discharge termination potential in Examples 6 to 10 and Comparative Example 2.
Figure 7:
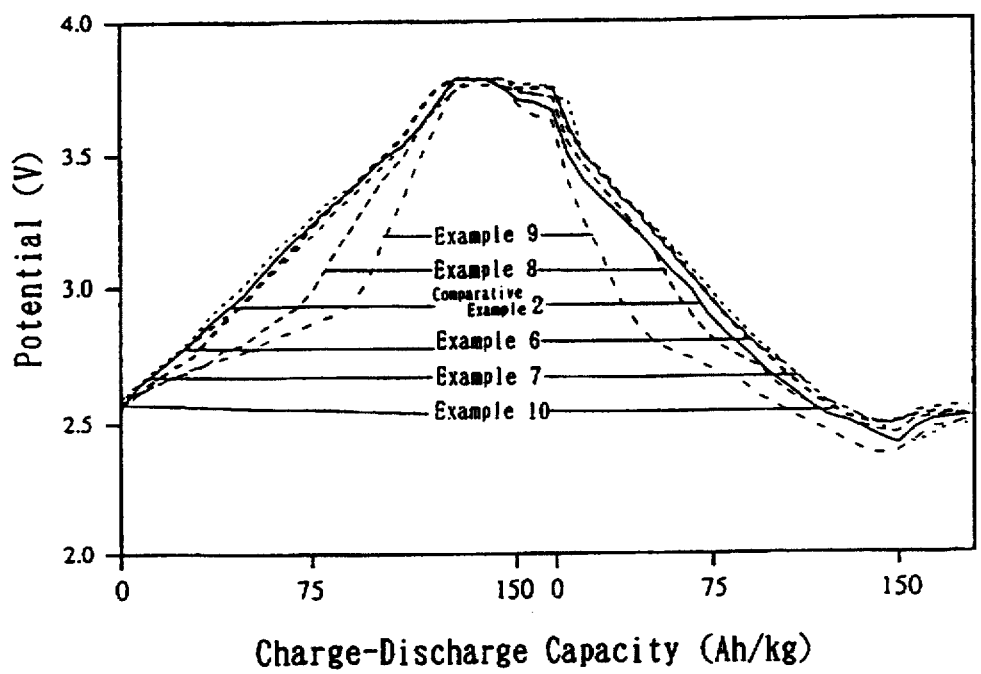
FIG. 7 is a graph showing the relationship between the charge-discharge capacity and the potential in Examples 6 to 10 and Comparative Example 2.
Figure 8:
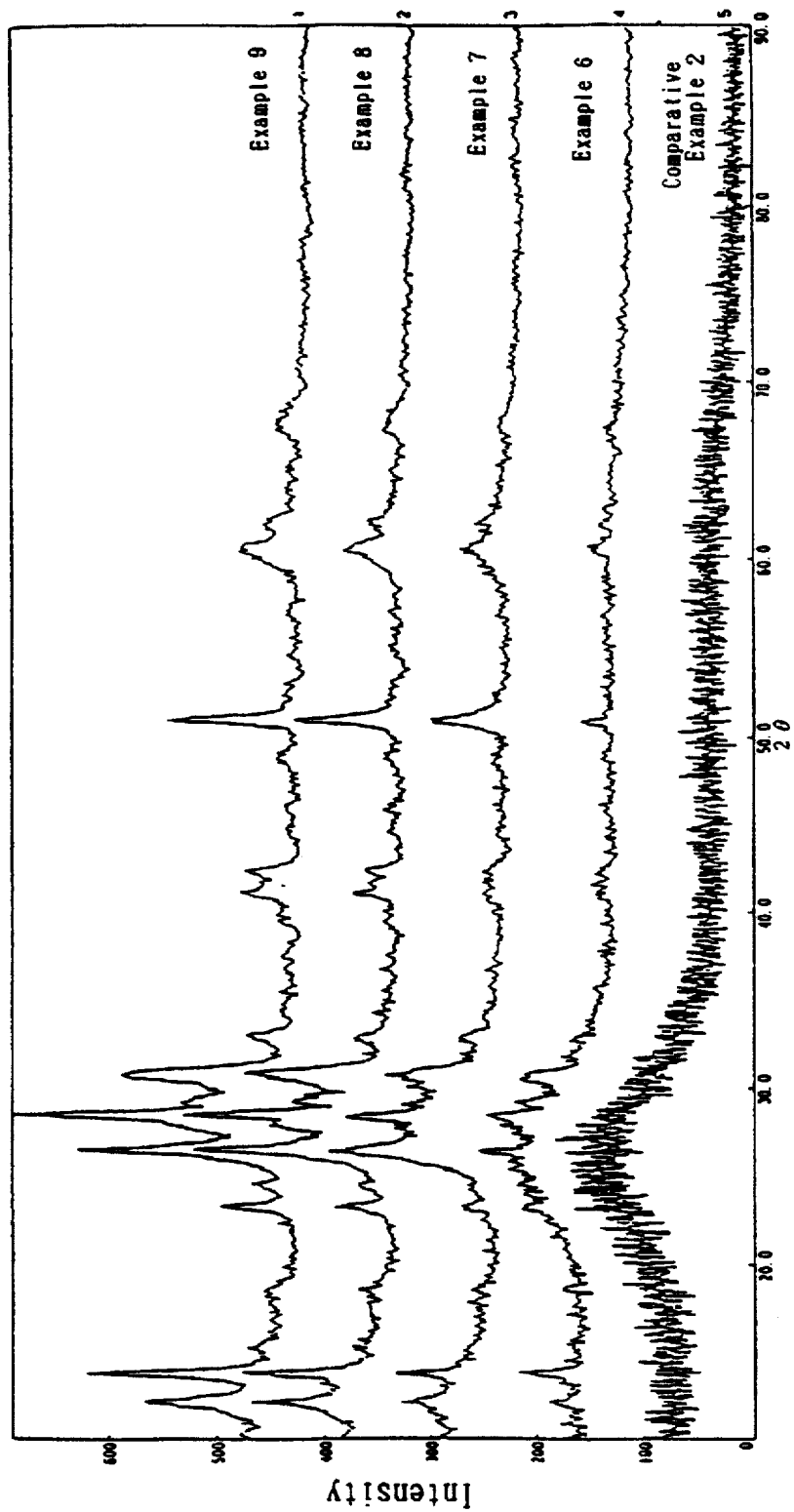
FIG. 8 shows X-ray diffraction patterns of cathode material powders obtained in Examples 6 to 9 and Comparative Example 2.

The relationship between the heat-treating conditions and the resistivity is shown in FIG. 4, the relationship between the heat-treating conditions and the change in potential on the stoppage of discharge is shown in FIG. 5, the relationship between the cycle number and the discharge termination potential is shown in FIG. 6, the relationship between the chargedischarge capacity and the potential is shown in FIG. 7, and X-ray diffraction patterns of the resulting cathode material powders are shown in FIG. 8.

EXAMPLES 7 TO 10

Various tests were carried out in the same manner as with Example 1 with the exception that the cathode material powder obtained in Example 6 was heat treated at 200° C. (Example 7), at 300° C. (Example 8), at 400° C. (Example 9) in the air or at 200° C. in a stream of hydrogen (Example 10). Results are shown in FIGS. 4 to 8.

COMPARATIVE EXAMPLE 2

Various tests were carried out in the same manner as with Example 6 with the exception that the cathode material powder obtained in Example 6 was not heat treated. Results are shown in FIGS. 4 to 8.

FIG. 4 shows that the cathode material heat treated at 200° C. or more is significantly decreased in resistivity. FIG. 5 reveals that the electrochemical polarization is also reduced with a decrease in resistivity shown in FIG. 4, wherein the change in potential on the stoppage of discharge in FIG. 5 means the difference in potential between the beginning and the end of the stoppage of discharge. The smaller the difference, the smaller the polarization. FIG. 6 indicates that all the heat-treated materials (Examples 6 to 10) are higher in discharge termination potential than material not heat treated, and therefore excellent in energy density, and that particularly, the materials heat treated at a temperature of 200° to 300° C. can extremely improve their performance. FIG. 7 shows that the linear potential curves having no flat positions which characterize amorphousness are obtained at a heat-treating temperature of 300° C. or less. FIG. 8 reveals the higher heat-treating temperature provides higher peaks, resulting larger crystalline structure units.

We claim:

1. A battery cathode of a lithium battery comprising:

a conductive agent, a binding agent, and a solid solution comprising $V_2O_5$, $CoO_2$,$P_2O_5$, MO, wherein M represents an alkaline earth metal element, and at least one lithium compound selected from the group consisting of lithium-oxygen compounds, lithium halides and lithium oxygen acid salts, wherein the amount of Li ions of the Li compound is 2 mols or less per mol of $V_2O_5$.

2. The battery cathode as claimed in claim 1, wherein the solid solution is a heat-treated solid solution.

3. A method for producing a cathode material for a lithium battery which comprises melting a mixture of $V_2O_5$, $CoCO_3$, $Ca(H_2PO_4)_2 \cdot H_2O$ and at least one lithium compound selected from the group consisting of lithium-oxygen compounds, lithium halides and lithium-oxygen acid salts to form a melt, and then putting the melt into water to quench it, to form an amorphous solid solution of $V_2O_5$, $CoO_2$, $P_2O_5$, CaO and said Li compound.

4. The method as claimed in claim 3, wherein a heat treatment is conducted at a temperature of 100° to 500° C. after quenching.

5. A method for producing a cathode material for a lithium battery which comprises melting a mixture of $V_2O_5$, $CoCO_3$ and $(CaH_2PO_4).Ca(H_2PO_4)_2 \cdot H_2O$ and at least one lithium compound selected from the group consisting of lithium-oxygen compounds, lithium halides and lithium oxygen acid salts to form a melt, and then pressing the melt between metal plates to quench it, to form an amorphous solid solution of $V_2O_5$, $CoO_2$, $P_2O_5$, CaO and said Li compound.

6. The method as claimed in claim 5, wherein a heat treatment is conducted at a temperature of 100° to 500° C. after quenching.

7. A cathode material for a lithium battery comprising a solid solution comprising $V_2O_5$, $CoO_2$, $P_2O_5$, MO, wherein M represents an alkaline earth metal element, and LiOH wherein the amount of LiOH is 2 mols or less per mol of $V_2O_5$.

8. A battery cathode of a secondary lithium battery comprising:

a conductive agent, a binding agent, and an amorphous and crystalline solid solution that comprises $V_2O_5$, $CoO_2$, $P_2O_5$, MO, wherein M represents an alkaline earth metal element, and at least one lithium compound selected from the group consisting of lithium-oxygen compounds, lithium halides and lithium oxygen acid salts; and wherein said solid solution has been heat treated at a temperature greater than the glass transition temperature of the solid solution.

9. A battery cathode of a secondary lithium battery comprising:

a conductive agent, a binding agent and a crystalline solid solution comprising $V_2O_5$, $CoO_2$, $P_2O_5$, MO, wherein M represents an alkaline earth metal element, and at least one lithium compound selected from the group consisting of lithium-oxygen compounds, lithium halides and lithium oxygen acid salts; and wherein said solid solution has been heat treated at a temperature greater than the glass transition temperature of the solid solution.

10. The battery cathode as claimed in claim 8, wherein the amount of the Li ions in the Li compound is 2 mols or less per mol of $V_2O_5$.

11. The battery cathode of a secondary lithium battery as claimed in claim 8, wherein the change of electric potential caused by doping and dedoping is a straight line function of potential versus electrode capacity during charge-discharge.

12. A method for producing a cathode material for a secondary lithium battery which comprises:

forming a melt of an amorphous solid solution of $V_2O_5$, $CoO_2$, $P_2O_5$, MO, wherein M represents an alkaline earth metal element, and at least one lithium compound selected from the group consisting of lithium-oxygen compounds, lithium halides and lithium oxygen acid salts, quenching the melt, pulverizing said melt into a powder, and heat treating the powder at a temperature greater than the glass transition temperature of the solid solution.

13. A method as claimed in claim 12, wherein the quenching step comprises putting of the melt into water or pressing the melt between metal plates.

14. A method as claimed in claim 12, wherein the powder is an average size of 5 μm or smaller.

15. The method as claimed in claim 12, wherein the heat treatment temperature is from 210° to 500° C.

16. The method as claimed in claim 12, wherein the heat treatment temperature is from 210° to 300° C.

17. A method for producing a cathode material for a secondary lithium battery, comprising:

mixing $V_2O_5$, $CoCO_3$, $Ca(H_2PO_4)_2 \cdot H_2O$ and at least one lithium compound selected from the group consisting of lithium-oxygen compounds, lithium halides and lithium-oxygen acid salts;

melting the mixture to form a melt solution of $V_2O_5$, $CoO_2$, $P_2O_5$, CaO and said lithium compound;

quenching the melt to form an amorphous solid solution; and heat treating the said solid solution at a temperature above a glass transition temperature of said solid solution.

18. The method as claimed in claim 17, further comprising pulverizing said solid solution into a powder, either before or after heat treating.

19. The method as claimed in claim 17, wherein the heat treating temperature is from 210° to 500° C.

20. A secondary lithium battery, comprising a cathode comprised of a solid solution of $V_2O_5$, $CoO_2$, $P_2O_5$, MO, wherein M represents an alkaline earth metal element, and at least one lithium compound selected from the group consisting of lithium-oxygen compounds, lithium halides and lithium oxygen acid salts;

an electrolyte; and a carbon anode.

* * * * *